Patented Feb. 22, 1938

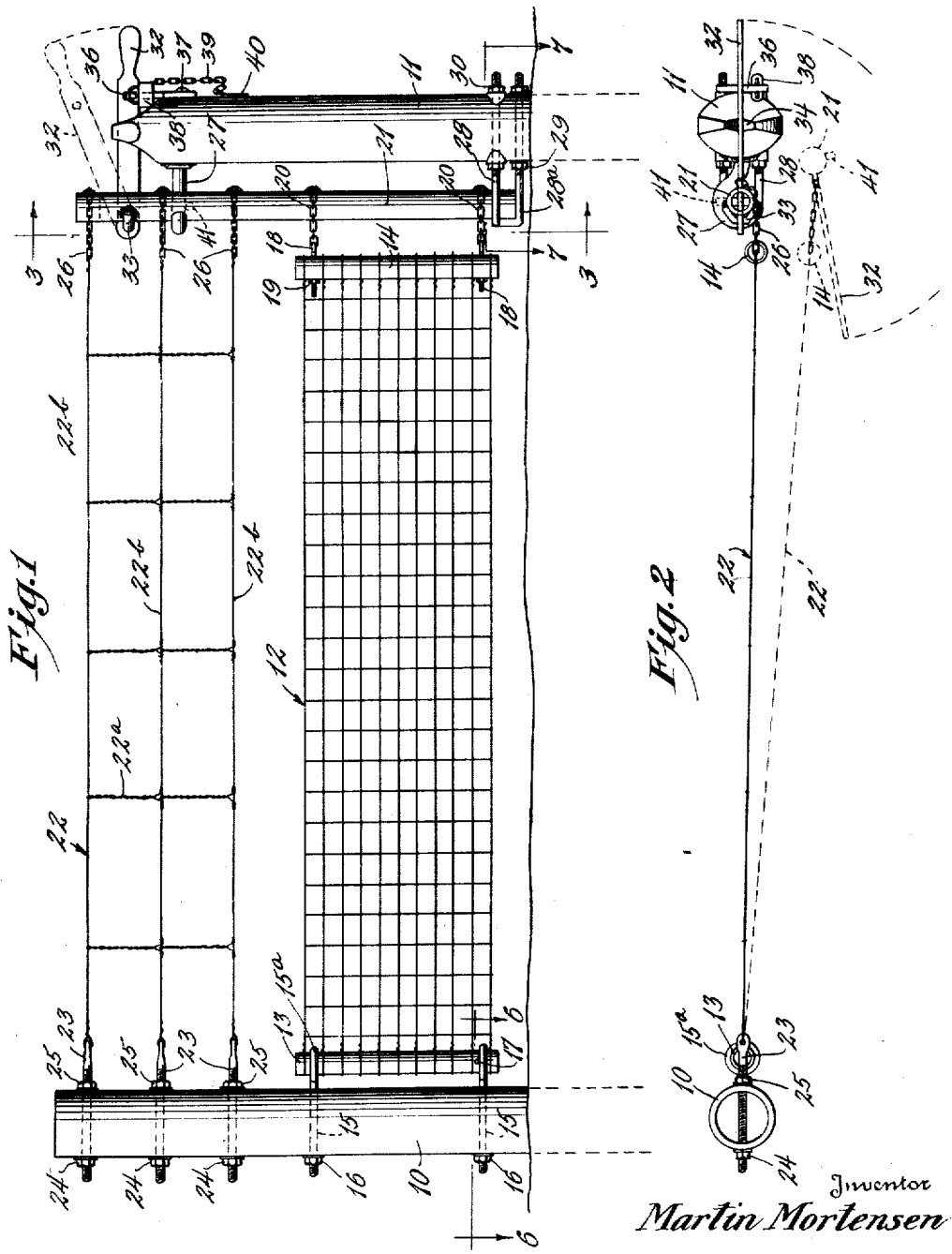

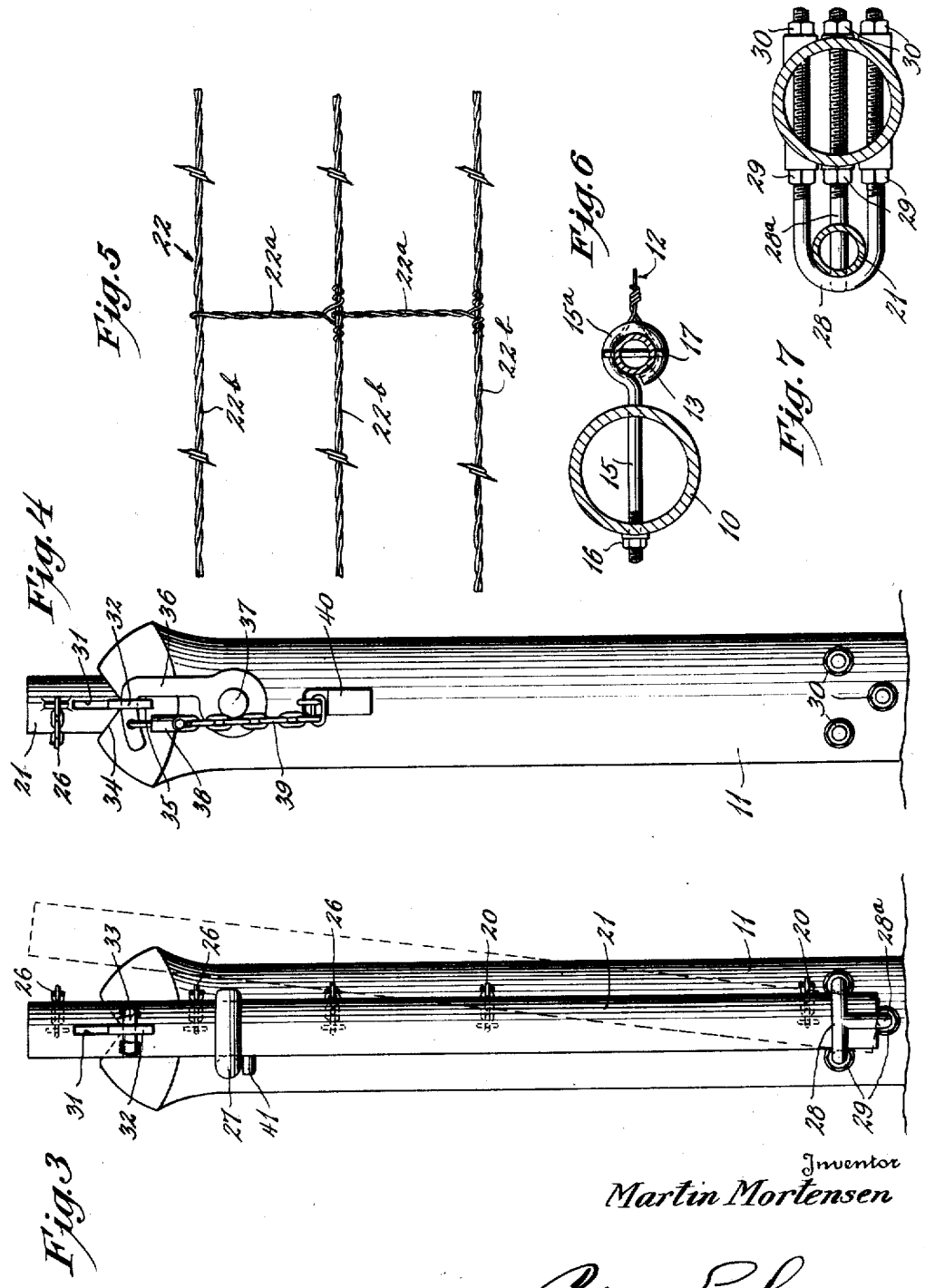

2,109,300

UNITED STATES PATENT OFFICE 2,109,300

GATE

Martin Mortensen, Verdi, Nev.

Application March 11, 1936, Serial No. 68,331

1 Claim. (Cl. 39—74)

This invention relates to gates, and among other objects, aims to provide an improved farm gate which may be manufactured at low cost and be easily erected and which cannot sag when closed and locked. The invention has other objects which will be understood from the following description of a preferred embodiment thereof.

In the accompanying drawings forming a part of this specification,—

Fig. 1 is an elevation of the gate, showing in dotted lines the locking lever in an unlatched position;

Fig. 2 is a top plan of the same, showing in dotted lines the gate partly open;

Fig. 3 is a section on line 3—3 of Fig. 1, but on a larger scale and showing in dotted lines the gate end member in an alternative position;

Fig. 4 is a side elevation of the gate post shown in Fig. 3, and on the same scale but viewed from the opposite side;

Fig. 5 is an enlarged detail of part of the wiring making up the body of the gate;

Fig. 6 is a section on line 6—6 of Fig. 1; and

Fig. 7 is a section on line 7—7 of Fig. 1.

Referring particularly to the drawings, there is shown a farm gate comprising two gate posts 10, 11, the post 10 swingably supporting the gate, which is preferably, though not necessarily, formed of two different sections of fence wire, the lower section 12 being of much finer mesh than the upper section to be described. The wire 12 is joined to vertical pipe sections 13 and 14 at either end, the pipe section 13 being rotatable within the eyes 15a of eye-bolts 15, which pass through the post 10 and are secured by nuts 16. Pins 17 which are passed through the pipe section 13, support the pipe section on the eye-bolts as shown in Fig. 6. The post 10 may be a section of a pipe of large diameter or it may be a solid wood post. If a pipe is used, after the gate has been erected the interior of the pipe comprising the post may be filled with Portland cement to increase the rigidity of the post and also to protect the bolts which are secured to the post as described herein. The outer pipe section 14 is supported by means of eye-bolts 18 secured by nuts 19 to the pipe section and connected by short chain lengths 20 to a gate end member 21 which is also preferably a pipe section. Thus the outer end of the lower fence wire section 12 is supported from the end member 21 which in turn is supported by the gate post 11 in a manner to be described.

The upper part of the gate is composed principally of intertwisted wire strands 22 including vertical strands 22a and horizontal strands 22b. The horizontal strands may be of barb wire as shown in Fig. 5 or of any other known type of wire used for fencing; and the preferred manner in which the wire strands are united is clearly shown in Fig. 5. The strands 22a, 22b are preferably widely spaced apart so that the upper portion of the gate may be said to be of wire of large or open mesh. Also, this upper portion of the gate is connected to the posts independently of the lower portion of the gate. As shown, the strands 22b are directly connected with eye-bolts 23 which preferably are threaded throughout their length and pass through apertures in the fence post 10, nuts 24 and 25 securing the eye-bolts against movement in either direction, relative to the fence post. This arrangement permits longitudinal adjustment of each of the eye-bolts 23, but does not require expensive threading of the bores through which the eye-bolts are passed. It will be clear that each of the horizontal strands 22b may be individually adjusted for tension, so as to cause the upper part of the gate to stand erect or lie in a substantially vertical plane. The opposite ends of the strands 22b are individually connected with short lengths of chains 26, whose other ends are secured to the gate end member 21 in such a way that the chain lengths 26 may be wrapped around said gate end member when the latter is rotated about its longitudinal axis.

Secured to the gate post 11 next the upper end thereof and projecting longitudinally therefrom is a hook shaped member 27, the hook end of which is open on the side towards which the gate swings as it closes. Said hook-like member is adapted to receive and hold the gate end member 21 and yet permit axial rotation of the gate end member as will be described. The lower end of the gate end member is adapted to be received within a support provided by a U-bolt 28 (best shown in Fig. 7) having an intermediate prong or arm 28a below the plane of the U-bolt and adapted to provide a support for the lower end of gate end member 21, as clearly shown. Nuts 29 and 30 and the necessary fillers may be provided as shown to secure the U-bolt member 28 adjustably to the gate post 11, or if desired, the U-bolt 28 including the arm 28a may be permanently secured to the post 11 as by welding. The gate end member 21 obviously can rotate when engaged with the hook member 27 and the U-bolt member 28 and still both members cooperate to hold the gate end member 21 in a proper position relative to the gate post 11 and so as to hold the upper and lower sections 22, 12 of the gate in stretched or tensioned condition.

In order to lock the gate when closed, the gate end member 21 has a longitudinal slot 31 in which a lever arm 32 may swing as clearly shown in Fig. 1. Lever arm 32 is pivoted on a horizontal pin 33 which is passed through gate end member 21 near the lower end of slot 31 and hence swings vertically and is so positioned that it may enter a recess 34 provided in the top of the gate post 11 and then may fit snugly into a slot 35 provided at the bottom of the recess 34. When the lever arm 32 is pushed downwardly into slot 35 it will prevent rotation of the gate end member 21 to which it is attached. Obviously, however, it is necessary to rotate the gate end member 21 and hence to tighten the gate sections 12 and 22 by means of their chains 20 and 26 respectively before engaging the lever 32 with the slot 35. Thus the lever arm provides a convenient means for tightening or tensioning the gate and also to latch or lock the same.

When the lever arm 32 is in gate locking position, it is sometimes advisable to secure the same against tampering and hence a latch finger 36 mounted on a pin 37 on gate post 11 has its upper end passed through an aperture in lever arm 32 as shown in Fig. 4. A padlock 38 may be passed through one end of the latch finger 36 and may be connected by a chain 39 to a plate 40 welded to the gate post 11. It will be clear that the latch finger 36 will prevent the lever arm 32 from rising due to any reaction of the gate on the lever arm. A pin 41 secured to the gate end member 21 is adapted to fit under the hook-like member 27 to hold the gate down with the end member 21 firmly seated in the support 28, 28a.

Obviously the pin 41 is brought into engagement with the underside of the hook-like member 27 when the gate end member 21 is rotated in the proper direction by the lever arm 32.

The described gate is so made that it may always be in tension, and hence sagging is never necessary and can be wholly eliminated, even if one of the fence posts should lean a little out of plumb. The gate has the further advantage that its wire body may be renewed, at little expense. Ordinary fence wiring may be used for either or both sections of the gate body. The gate is light in weight, and hence is easy to swing open and closes without difficulty because of the leverage afforded by the locking lever. Nearly all the parts which go to make up the gate are easily obtainable anywhere, and the few special parts are not difficult to make. The gate has other advantages and features which are more or less obvious and hence need not be pointed out.

It will be clear that the present invention is not limited to the preferred embodiment herein shown and described.

Having described one embodiment of my invention, what I claim as new and desire to secure by Letters Patent is:—

In a gate, in combination with a pair of fixed gate posts, a flexible gate connected to one of the posts and adapted to be locked to the other post; a lever secured to the gate at its free end in such a way that the lever may be swung to tighten or loosen the gate, said lever being directly engageable with the other gate post to hold the gate in tension; said other gate post having a slot in its top providing a keeper for the lever, which is swung vertically down into the slot.

MARTIN MORTENSEN.